Feb. 23, 1932.  J. A. FLINT  1,846,326
ELECTRIC RECIPROCATING MOTOR
Filed Nov. 2, 1926    4 Sheets-Sheet 4
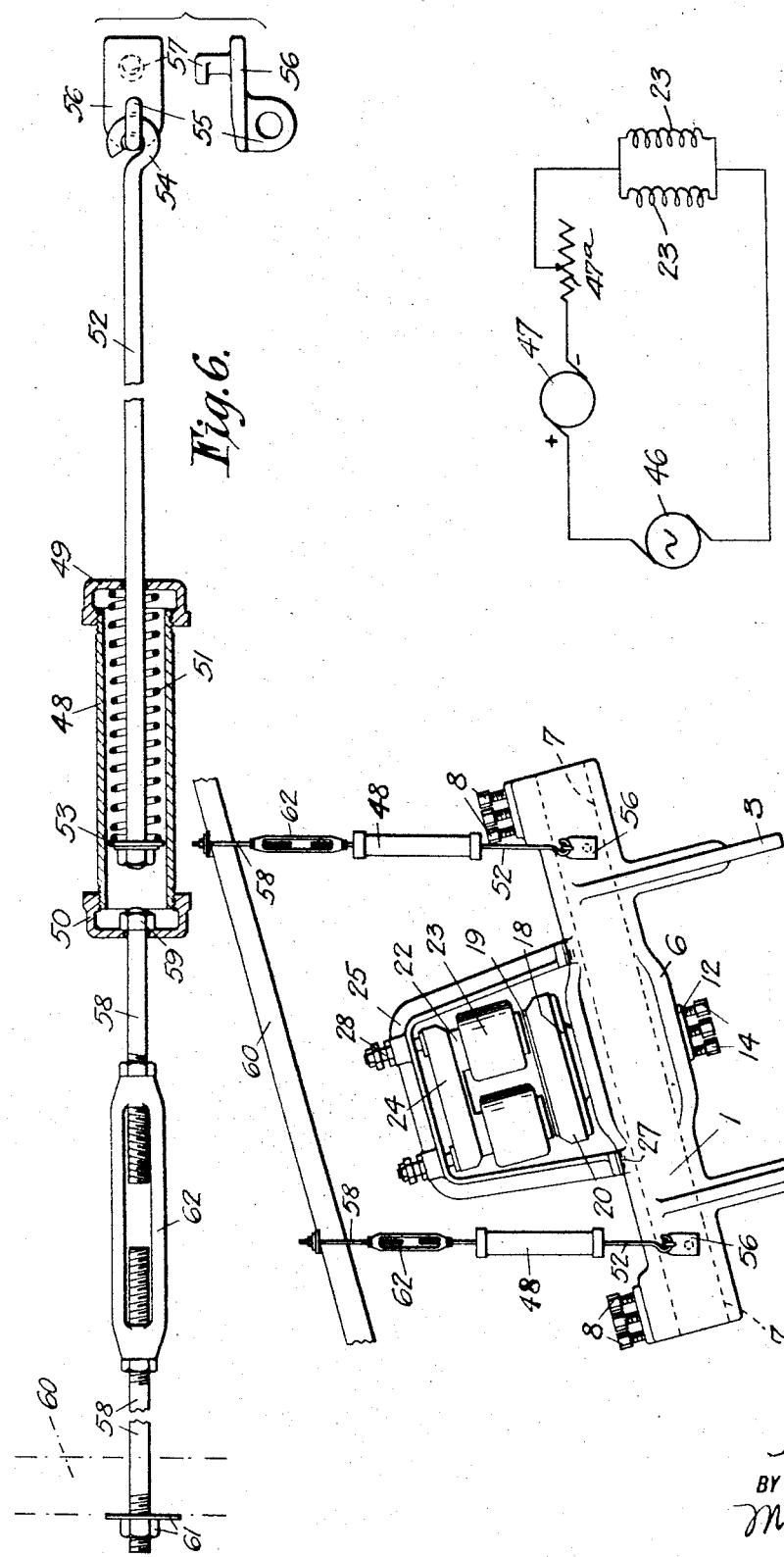
INVENTOR
JAMES A. FLINT.
BY
ATTORNEYS Patented Feb. 23, 1932

1,846,326

UNITED STATES PATENT OFFICE

JAMES A. FLINT, OF DENVER, COLORADO, ASSIGNOR TO THE TRAYLOR VIBRATOR COMPANY, OF DENVER, COLORADO, A CORPORATION OF COLORADO

ELECTRIC RECIPROCATING MOTOR

Application filed November 2, 1926. Serial No. 145,788.

This invention relates to an improved electric reciprocating motor or vibrating mechanism, adapted when energized by supplying electric current thereto to produce uniform vibratory or reciprocatory movements at a high frequency of the member or mechanism which it is desired to vibrate or reciprocate and with which the motor or vibrating mechanism is associated.

The improved motor or vibrating mechanism in accordance with the invention may be employed in many different ways and for many different purposes, and in fact it is capable of application or use in practically any case in which it is desired to produce vibratory or reciprocatory movement of a member or mechanism. For example, the improved motor or vibrating mechanism may be employed to effect vibration or reciprocation of the vibratory or reciprocatory element or elements of material treating apparatus such as screens, concentrators, crushers and the like, or of percussive tools such as rock drills, riveting hammers and the like, or of massage or other apparatus. The invention is not, however, restricted to these particular uses or applications thereof, as any other uses or applications therefor may be found.

The object of the invention is to provide an improved form of electric reciprocating motor or vibrating mechanism which is of simple construction and arrangement and compact in size, and which will operate with a maximum of efficiency and with a minimum consumption of power to effect vibratory or reciprocatory movement of a member or mechanism to be vibrated at a high and predetermined or desired frequency.

The invention essentially consists in an electric reciprocating motor or vibrating mechanism which comprises an electro-magnetic operating means, and a resilient means or vibrator element or elements designed or arranged to mutually coact in synchronism with each other to cause vibration of, and to maintain in vibration, a vibrated member of predetermined weight or load at a predetermined frequency.

In utilizing the improved motor or vibrating mechanism the vibrating weight or load of the member or mechanism which is to be vibrated or reciprocated may be calculated or predetermined, and a vibrator element or elements designed or built up in such form as to be capable of maintaining said calculated or predetermined weight in vibratory or reciprocatory movement at or substantially at a predetermined frequency. Such vibratory element or elements will be so designed or arranged as to be capable when deflected or vibrated from a neutral position thereof, of developing or building up restoring forces of such magnitude as to return the predetermined vibrating weight to the neutral position in the same time as taken to deflect the vibrator element or elements from said position. The electro-magnetic means will be designed or arranged to apply the necessary deflecting forces to the vibrator element or elements, or resilient means, at the predetermined or desired frequency, whereby the electro-magnetic means and the vibrator element or resilient means will properly cooperate in synchronism to maintain the desired frequency of vibration of the predetermined or calculated vibrating weight of the vibrated member.

The invention is illustrated in the accompanying drawings and will be described in detail in its specific application to the vibration of a screening machine for screening ores or other materials, but it will be understood that this is merely illustrative of the manner in which the invention may be applied and used.

In the drawings:

Fig. 4 is a diagrammatic view of the electrical means for furnishing the current for operating the motor;

Fig. 5 is a side elevational view on a reduced scale showing the manner of mounting the screen structure; and Fig. 6 is a detail sectional view of one of the cushioning and supporting elements for the screen structure.

Figure 1:
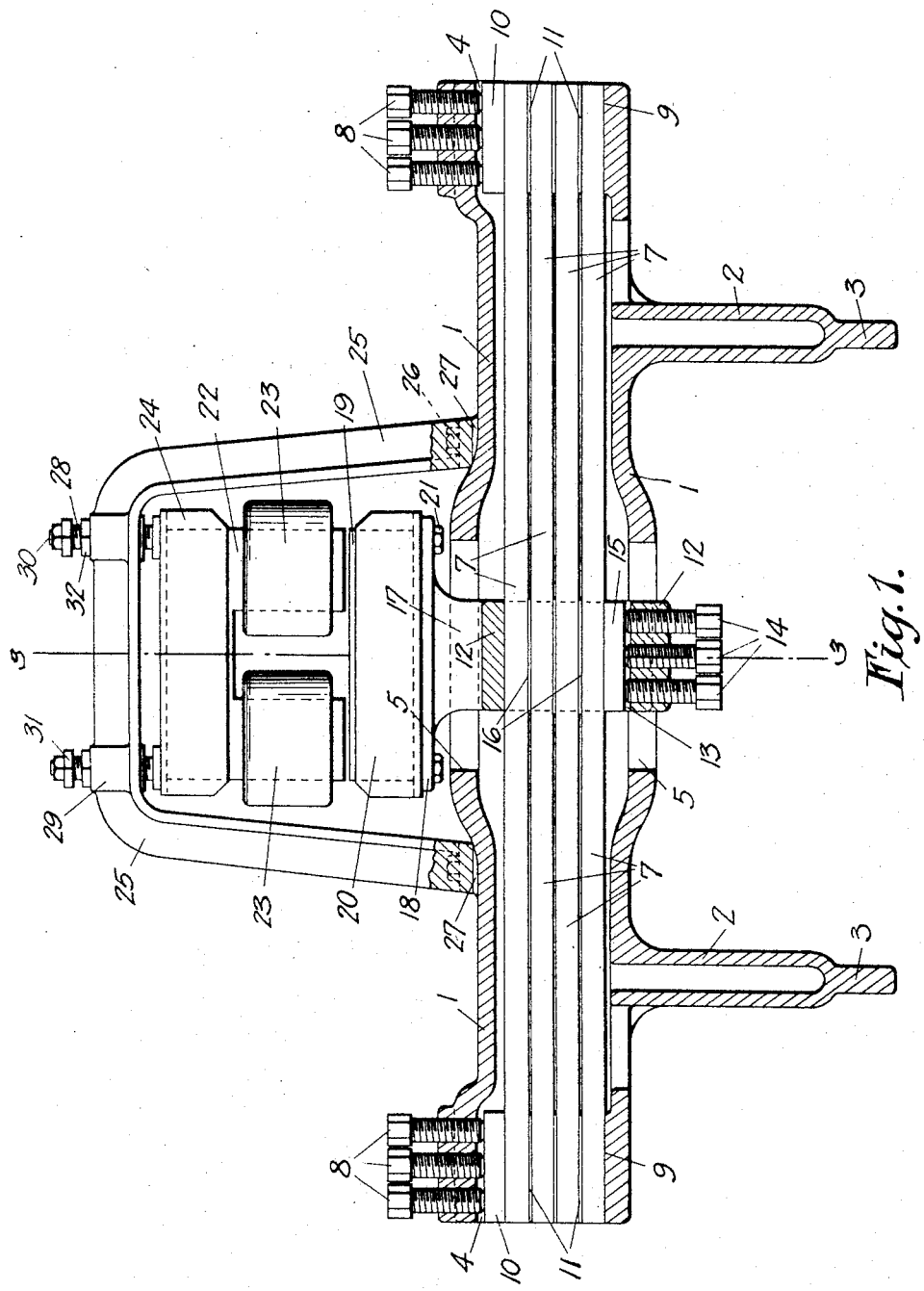
Fig. 1 is a longitudinal sectional view of the screen structure, particularly showing the arrangement and manner of mounting the electric reciprocating motor or vibrating mechanism, the section being taken along the line 1—1 of Fig. 2.

The screening machine to which the electric reciprocating motor forming the essential subject matter of the present invention is applied according to the construction thereof shown in the drawings, comprises a main supporting frame or structure, which essentially comprises two spaced apart and longitudinally extending parallel side frame portions 1, which are of hollow formation to receive and enclose the vibrator elements hereinafter referred to. These longitudinal side frame portions are rigidly connected together by two transversely extending connecting members or braces 2, which may conveniently be of hollow form as shown, and may be additionally strengthened by means of an integral projecting rib or fin 3. For convenience of construction the entire frame may be in the form of a casting as shown, in which the side portions 1, connecting members 2 and ribs 3 together comprise an integral structure, the connecting members 2 extending downwardly from the side portions 1 and thence transversely, and the ribs 3 extending upwardly along the outer faces of the side portions 1. This formation of the main frame as an integral casting is not, however, essential.

Figure 2:
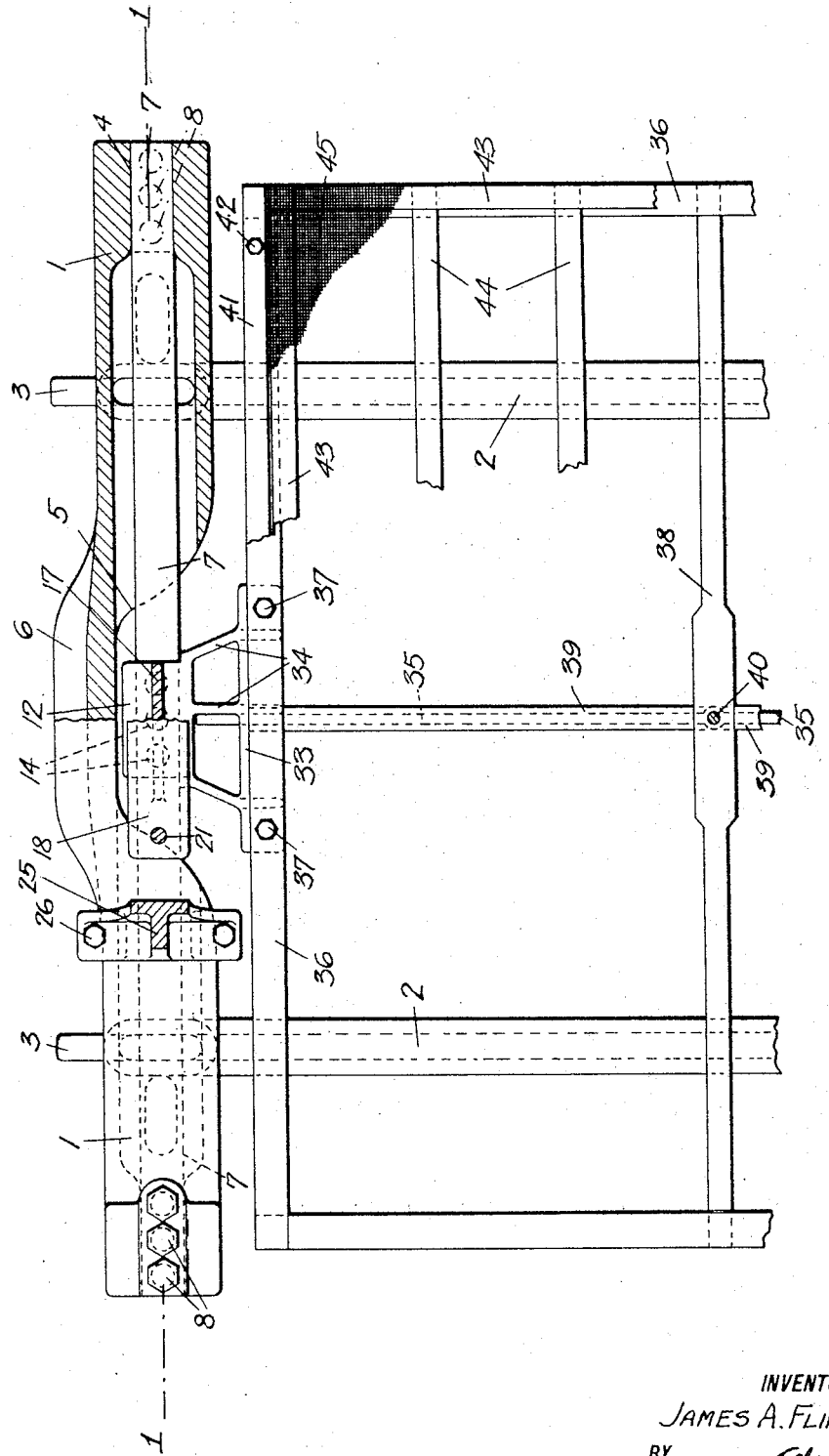
Fig. 2 is a plan view partly in section of one-half of the screen structure.
Figure 3:
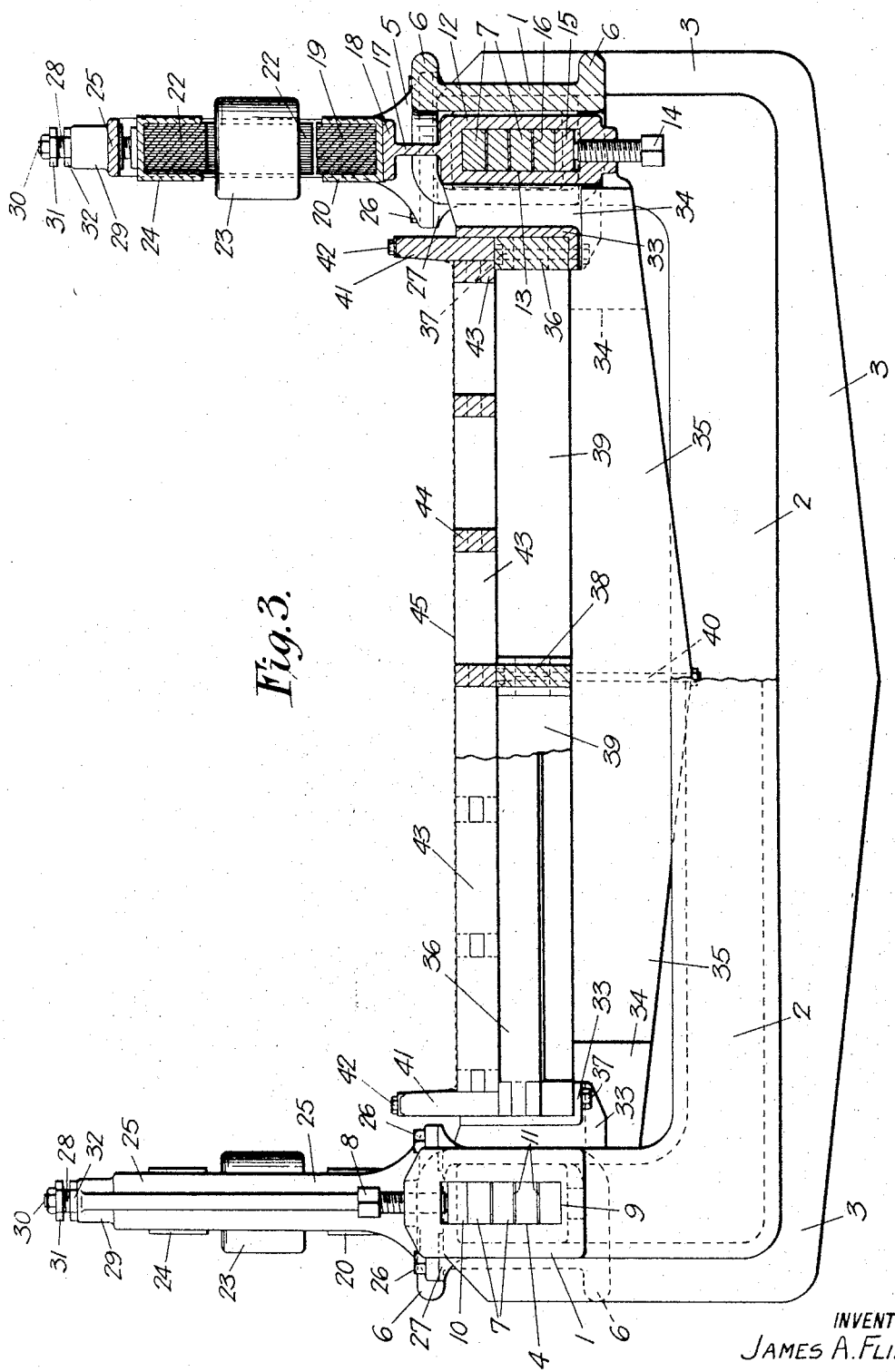
Fig. 3 is an end elevation partly in section of the screen structure, the section being taken along the line 3—3 of Fig. 1.

Each of the side frame portions 1 is of hollow rectangular form as clearly shown by the dotted lines in Fig. 3, the central opening of the frame portion being increased in height and decreased in width at each end of the frame portion, as clearly shown in Figs. 1 and 2, to provide the rectangular recess or pocket 4 to receive the corresponding end of the vibrator element, as clearly shown at the left of Fig. 3. Each of the side frame portions 1 at the central portion thereof is cut away at the inner side thereof and including the upper and lower walls thereof, as clearly indicated at 5 in Figs. 2 and 3, to accommodate the connections between the vibrator elements and the screen frame. The side frame portions are suitably strengthened at these points by a thickening of the outer wall and by the provision of suitable strengthening flanges or ribs 6.

In the particular application of the invention illustrated in the drawings two operating motors or vibrating mechanisms are employed, one of which is associated with and supported by each of the side frame portions 1. Each of these motors or mechanisms comprises a vibrator element or elements and an electro-magnetic means associated therewith.

The vibrator element, as shown, is in the form of a flat bar element which is anchored or fixed at each of the ends thereof, and is capable of vibrating at its intermediate or middle portion. This bar element may be in the form of a unitary bar, but it is preferred to employ an element built up in the form of a plurality of juxtaposed or superposed bars 7. The particular form of element shown in the drawings comprises four of these bars superposed one upon another.

The vibrator element so formed extends longitudinally within and is enclosed, excepting at its central portion, by the corresponding side frame portion 1 of the main frame. Each end of the vibrator element extends within the rectangular recess or pocket 4 formed in the corresponding end of the side frame portion, as above described, and the end of the element is securely anchored or fixed within this recess or pocket by means of screws 8 threaded into the upper wall of the recess and screwed down to securely or tightly clamp the ends of the bars constituting the vibrator element. The ends of the vibrator element preferably rest upon the raised surfaces 9 which form the lower walls of the recesses or pockets 4 and these surfaces may be machined to provide accurately formed seating surfaces for the ends of the vibrator element. It is also preferred, instead of having the inner ends of the screws 8 bearing directly against the uppermost bar 7, to interpose a block 10 of substantially the same length as the seating surface 9 between the ends of the screws and the uppermost bar. Also, if desired, short plates 11 of fibre or the like may be interposed between the ends of the respective bars.

Securely clamped or fixed to the middle portion of the vibrator element constituted by the group of bars 7, is a bracket member 12, which, in the form thereof shown surrounds the vibrator element, being provided with a rectangular recess or opening 13 through which the vibrator element passes. The upper surface of the vibrator element bears against the upper wall or surface of the recess or opening 13, which may be machined to provide an accurately formed seating surface, and the bracket member is securely clamped or fixed to the vibrator element by means of screws 14 threaded into the lower wall of the bracket member and adapted to hold the vibrator element securely against the upper wall of the bracket member. In this case also it is preferred to interpose between the ends of the screws and the lowermost bar 7 a block 15 of substantially the same length as the bracket member, and short plates 16 of fibre or the like may be interposed between the respective bars.

Each of the bracket members 12 is provided with an upstanding portion or web 17 carrying a flange 18 for supporting the armature of the associated electro-magnetic means.

This armature 19 is of laminated construction and is mounted in a suitable core holder 20 of non-magnetic material which is in turn suitably secured, as by means of bolts 21, to the supporting flange 18 of the bracket member 12.

The stator portion of the electro-magnetic means, in the form thereof shown, comprises a substantially C-shaped laminated core 22 upon the arms or poles of which are arranged the energizing coils 23, which are adapted to be connected to a suitable source of supply of alternating or pulsating current. The core 22 is mounted in a suitable core holder 24 of non-magnetic material, which is in turn supported from a supporting bracket or standard 25 of inverted U-shaped form, the lower ends of the arms of the bracket or standard being suitably secured, as by means of screws 26, upon bracket lugs 27 formed upon the upper portion of the side frame portion 1.

It is preferred to mount the core 22 in an adjustable manner, so as to enable the position of the pole faces thereof to be adjusted with reference to the adjacent face of the armature 19. For this purpose the core holder 24 is supported from the standard or bracket 25 by means of adjusting devices, each of which, in the form shown, comprises a screw threaded sleeve 28 threaded into a boss 29 on the standard 25. The sleeve is secured to the core holder by means of a bolt 30 passing through the sleeve, in a manner permitting rotation of the sleeve relatively to the core holder. Thus by rotation of the sleeves in one direction or the other the core may be moved toward or away from the armature, the sleeves being provided with heads 31 by which they may be turned, and with lock nuts 32 for locking them after adjustment.

The bracket members 12 are also provided with angular supporting portions 33 for supporting the screen member. In the form thereof shown these supporting portions are formed integrally with the bracket members, being connected therewith by means of webs or fins 34, the middle one of which extends downwardly and inwardly beyond the others. Extending across between the bracket members 12 is a spanner member or plate 35, the respective ends of which are suitably secured, as by welding or bolting, to the middle webs or fins 34 of the bracket members. Preferably the middle webs 34 are offset from the centers of the bracket members so as to engage opposite faces of the spanner member 35.

It will be seen that the two bracket members 12 and the spanner member or plate 35 together form a unitary structure, which together with the screen frame supported thereby may be termed a "vibrated member" and which is supported by and firmly secured to the vibratable middle portions of the vibrator elements 7.

The screen member or frame upon which the screen cloth is secured may be of any suitable or desired construction and arrangement. In the arrangement shown a main frame or sash 36 is provided which is directly supported at opposite sides thereof upon the supporting portions 33 of the bracket members 12, being secured thereto, as by means of bolts 37. This frame comprises side and end members suitably mortised or otherwise secured together, a central longitudinal member 38, and transverse central members 39. The transverse members 39 rest upon the upper edge of the spanner member 35, and the central longitudinal member may be secured to this spanner member as by means of a bolt or bolts 40. Side members or boards 41 are secured to the side members of the main sash 36 as by means of bolts 42.

Supported upon the main sash 36 between the side boards 41 is the sub-frame or sash 43 which, in the form shown, comprises side and end members suitably mortised or otherwise connected together, and a plurality of longitudinally extending intermediate members 44 suitably mortised or otherwise connected to the end members of the frame. The screen material or screen cloth 45 is secured or stretched upon the sub-frame or sash 43 in any suitable or usual manner, and the sub-frame or sash is itself secured to the main frame or sash 36 in any suitable manner, as by means of bolts or clamping devices.

It will be understood from the above description that the electric reciprocating motor or vibrating mechanism forming the essential subject matter of the present invention, comprises the combination of a vibrator element or elements and an electro-magnetic means associated therewith, and this motor or vibrating mechanism is designed to cause vibration of, and to maintain in vibration, a vibrated member of substantially predetermined weight at a predetermined high frequency or rate of vibration. In the particular application of the invention to a screen as above described, the vibrated member comprises the brackets 12 and spanner member 35 and the screen frame or frames supported thereby, and it is obvious that the weight of this vibrated member can be closely predetermined. The vibrator element or elements is or are designed, with respect to the material, length, and cross-sectional dimensions of the same, so that said element alone, or said elements in combination, will have a period of vibration, and will be capable of developing restoring forces during deflection or vibration thereof, such as to maintain a vibrated member of predetermined vibrating weight in vibration at a predetermined frequency. The electro-magnetic means associated with the vibrator element or elements is designed to apply the necessary deflecting forces to the vibrator element to maintain the same in vibratory movement at said predetermined frequency.

In the particular arrangement described above, the vibrator element is anchored or fixed at the ends thereof and is capable of being deflected and of vibrating at its central portion, and of transmitting its vibratory movement to the vibrated member. The vibratory or reciprocatory armature of the electro-magnetic means is attached to the vibrator element, and the electro-magnetic means is energized by an alternating or pulsating current in such a manner as to apply electro-magnetic impulses or attractive forces to said armature, and thus to apply deflecting forces to said vibrator element at a predetermined frequency.

In the operation of this particular form of motor or vibrating mechanism the electro-magnetic means will apply a deflecting force to the vibrator element thereby deflecting the same in one direction from the neutral position thereof and correspondingly moving the vibrated member. This deflection of the vibrator element will cause the building up therein of a restoring force approximately proportional to the deflection thereof, which tends ultimately to bring the vibrated member to rest, and then as the deflecting force diminishes or ceases between the alternations or pulsations of current tends to restore the vibrated member and vibrator element to the neutral position. As the parts reach this neutral position the inertia of the parts carries them beyond the neutral position thereby causing deflection of the bar in the opposite direction and developing or building up therein a similar restoring force tending to arrest the movement of the vibrated member and then to restore the same again to the neutral position. This restoring force built up in the vibrator element will be assisted by the succeeding attractive or deflecting force of the electro-magnetic means, and as the parts again reach the neutral position this deflecting force of the electro-magnetic means together with the inertia of the vibrated member will again cause deflection of the vibrator element in the first direction again building up the necessary restoring force therein. This operation will continue as long as current is supplied to the energizing coils of the electro-magnetic means.

It will be understood that the attractive forces are intermittently applied to the armature in such a manner as to cause the same and the vibrator element to vibrate at a predetermined frequency, and that the vibrator element is so constructed or designed as to the material, length and cross-section thereof, and as to the predetermined vibrating weight of the vibrated member, as to maintain said vibrated member in vibration at said predetermined frequency so long as said attractive or deflective forces are intermittently applied in the manner stated. That is to say, the vibrator element is so designed that when deflected from the neutral position thereof in the manner described, restoring forces are developed or built up therein, which are of the necessary magnitude to return the said vibrated member to the neutral position in the same time as taken to move said vibrated member from said neutral position. Thus the electro-magnetic means and the vibrator element or elements will properly cooperate in synchronism with each other to maintain the vibrated member in vibration at said predetermined frequency.

The amplitude of vibration or movement of the vibrated member may be varied or determined by varying the strength of the current supplied to the energizing coils by any suitable or usual means provided for this purpose. The deflection of the vibrator element will be approximately proportional to the deflecting force applied thereto, which will in turn be proportional to the strength of current supplied to the energizing coils.

It is preferred to build up a vibrator element in the manner above described from a plurality of bar members, as this provides a certain range of adjustment of the one mechanism or machine to suit vibrated members of different predetermined weights. That is, different restoring forces are available by using one, two or more of the bar members to form the vibrator element.

For practical purposes affecting stability and control of the vibrator element and the operation of the machine or mechanism, it is preferred to so design or arrange the vibrator element or elements that the natural period of vibration thereof will be slightly out of synchronism with the frequency of the electro-magnetic impulses or deflecting forces, but such that the vibratory movement of such element or elements will be brought into and maintained in synchronism with the current frequency by the attractive or deflecting forces of the electro-magnetic means applied thereto. This arrangement enables the operation of the mechanism to be accurately controlled and provides for uniform vibratory movement of the vibrated member at the predetermined frequency without causing pounding of the parts or other disadvantages.

It is also preferred to energize the electro-magnetic means by what may be termed a "mixed current" obtained by superimposing a direct current upon an alternating current, or vice versa, in order to obtain what is in effect a pulsating current of predetermined frequency. This mixed current is obtained by an arrangement such as illustrated diagrammatically in Fig. 4, in which a suitable source 46 of alternating current of a suitable frequency, and a suitable source 47 of direct current are connected into the circuit including the energizing coils 23, one terminal of the alternating current source being, for example, connected to one terminal of the direct current source, while the other terminals of said sources are suitably connected with the energizing coils, a variable impedance 47 or the like being provided for controlling the magnitude of the current. The effect of this arrangement is to superimpose one current upon the other, whereby the direct current flow augments the alternating current flow in one direction and diminishes and with the addition of sufficient direct current neutralizes the alternating current flow in the reverse direction, thereby providing a succession of current impulses, or a succession of strong current impulses alternating with a succession of weak impulses according to the relative strengths of the currents from the respective sources.

It will be understood that in the case of a screen as above described, the main frame will usually be supported in a longitudinally inclined position as illustrated, for example, in Fig. 5, and it is preferred to suspend this frame from a suitable supporting structure through the medium of cushioning springs in order to prevent as far as possible the transmission of vibrations to the building or structure in which the screen is employed. The screen is shown in Fig. 5 as supported by means of four cushioning supporting means, each of which includes a suitable casing 48, see Fig. 6, closed at its ends by means of caps 49 and 50 respectively, and within which is enclosed a suitable compression spring 51. A rod 52 extending downwardly through the cap 49 is provided with a suitable abutment or plate 53 at its upper end, which rests upon the upper end of the spring 51, the lower end of this spring bearing against the cap 49. The lower end of this rod is of hooked form as at 54, and connected with an eye 55 of a hanger member 56 provided with a hooked projection 57 adapted to be inserted within a suitable aperture in the outer side wall of the corresponding side frame portion 1 of the main frame. A supporting rod 58 extends upwardly through the upper cap 50 of casing 48, being provided at its lower end with a suitable nut or abutment 59. The upper end of the supporting rod 58 extends through a suitable supporting structure, part of which is indicated at 60, the rod being provided above said structure with a suitable abutment or nut and washer 61. The supporting rod 58 is preferably formed in two parts as shown, the adjacent ends of which are threaded in opposite directions and coact with a suitable turnbuckle 62, whereby adjustment of the effective length of the rod and adjustment of the inclination of the screen may be effected.

It will, of course, be understood that although the invention has been described above in its specific application to, or embodiment in, a screen structure, the invention is not restricted to this particular application or embodiment thereof, as it may be applied in other ways, and adapted for other purposes. The invention broadly considered resides in the improved form of electro-magnetic motor or vibrating mechanism comprising in combination electro-magnetic means and a vibrator element or elements designed to mutually coact in synchronism to maintain a vibrated member of predetermined weight in vibratory movement at a predetermined high frequency. This vibrated member, by which is meant a member or means which is to be vibrated, may assume various forms according to the particular purpose for which the same is to be employed.

What I claim and desire to secure by Letters Patent is:—

1. An electric reciprocating motor, comprising a predetermined mass to be vibrated in space, supporting means, a vibratory element mounted on said supporting means for vibratory movement and itself supporting said predetermined mass, said element being predesigned with respect to its material, length and cross-sectional dimensions to be in itself capable of imparting to said mass vibratory movement at a predetermined frequency, and electromagnetic means mounted on said supporting means and arranged in electromagnetic connection with said vibratory element and adapted when energized to produce electromagnetic impulses effective to maintain said element in vibratory movement at said predetermined frequency.

2. An electric reciprocating motor as claimed in claim 1, having means operative to control the strength of said electromagnetic impulses to vary the amplitude of vibration of said vibratory element.

3. An electric reciprocating motor as claimed in claim 1, having means for energizing said electromagnetic means to produce electromagnetic impulses at a predetermined frequency slightly different from the predetermined frequency of said vibratory element.

4. An electric reciprocating motor, comprising a predetermined mass to be vibrated in space, supporting means, a vibratory element mounted on said supporting means, means on said supporting means for fixedly clamping the opposite ends of said element against movement, said vibratory element being capable of vibrating at its middle portion and being predesigned with respect to its material, length and cross-sectional dimensions to be in itself capable of imparting to said mass vibratory movement at a predetermined frequency, and electromagnetic means mounted on said supporting means and arranged in electromagnetic connection with the middle portion of said vibratory element and adapted when energized to produce electromagnetic impulses effective to maintain said element in vibratory movement at said predetermined frequency.

5. An electric reciprocating motor as claimed in claim 4, wherein said vibratory element comprises a flat bar element of greater width than thickness capable of vibrating in the direction of its thickness, and clamping means are provided for clamping the ends of said element with the flat faces thereof against said supporting means.

6. An electric reciprocating motor as claimed in claim 4, wherein said vibratory element is a built up element consisting of a plurality of juxtaposed flat bars of greater width than thickness grouped with their flat faces in adjacent relation, said element being capable of vibration in the direction of the depth of said group of bars, and clamping means are provided for clamping the ends of said group of bars in the direction of the depth thereof against said supporting means.

7. An electric reciprocating motor, comprising a predetermined mass to be vibrated in space, supporting means, a vibratory element mounted on said supporting means, means on said supporting means for fixedly anchoring the ends of said element against movement, permitting said element to vibrate at its middle portion, said vibratory element in its position of rest being free from longitudinal tension and being predesigned and constructed to be in itself inherently capable of imparting to said mass vibratory movement at a predetermined frequency, and electromagnetic means mounted on said supporting means and arranged in electromagnetic connection with the middle portion of said vibratory element and adapted when energized to produce electromagnetic impulses effective to maintain said element in vibratory movement at said predetermined frequency.

8. The combination with a member to be vibrated, of supporting means, a vibratory element mounted on said supporting means for vibratory movement and itself supporting said vibrated member, and electromagnetic means arranged on said supporting means in electromagnetic connection with said vibratory element and adapted when energized to produce repeated attractive forces, said vibratory element being arranged to be deflected to opposite sides of a neutral position by the attractive forces of said means and the inertia of said vibrated member respectively, and being so predesigned with respect to its material, length and cross-sectional dimensions that when so deflected it will inherently develop within itself restoring forces such as to bring said vibrated member to rest and to restore it to neutral position in the same time as taken to move it from said position.

9. The combination with a member to be vibrated, of supporting means, a vibratory element mounted on said supporting means, means on said supporting means for fixedly securing the opposite ends of said element against movement, said element being capable of vibrating at its middle portion and at said middle portion itself supporting said vibrated member, and electromagnetic means arranged on said supporting means in electromagnetic connection with said vibratory element and adapted when energized to produce repeated attractive forces, said vibratory element being arranged to be deflected to opposite sides of a neutral position by the attractive forces of said means and the inertia of said vibrated member respectively, and being so predesigned with respect to its material, length and cross-sectional dimensions that when so deflected it will inherently develop within itself restoring forces such as to bring said vibrated member to rest and to restore it to neutral position in the same time as taken to move it from said position.

10. The combination as claimed in claim 9, wherein said vibratory element is in the form of a flat bar element of greater width than thickness, and clamping means are provided for securing the ends of said element with the flat faces thereof against said supporting means.

11. The combination as claimed in claim 9, wherein said vibratory element comprises a built up element in the form of a plurality of juxtaposed flat bars arranged in a group with the flat faces thereof in adjacent relation, and securing means are provided for securing the ends of said group of bars in the direction of the depth thereof against said supporting means.

12. An electric reciprocating motor, comprising supporting means, vibrating means mounted in said supporting means so as to be capable of being deflected to opposite sides of a neutral position, said vibrating means being predesigned and constructed with reference to a predetermined mass to be vibrated and with respect to its material, length and cross-sectional dimensions so that when deflected from said neutral position it will be inherently capable of developing within itself a restoring force such as to restore said predetermined mass to said neutral position in the same time as taken to deflect said means from said position, an armature supported by said vibrating means, and electromagnetic means arranged in electromagnetic relation to said armature and adapted when energized to apply repeated electromagnetic impulses to said armature to cause repeated deflection of said vibrating means at a predetermined frequency.

13. Electric vibrating mechanism, comprising in combination, an element of predetermined mass to be vibrated, a frame, a vibrating element supported by said frame, means on said frame for fixedly anchoring the opposite ends of said vibrator element against movement, said vibrator element being capable of vibrating relatively to said frame at its middle portion and being predesigned solely with respect to its material, length and cross-sectional dimensions as to be capable of imparting vibratory movement to said predetermined mass at a predetermined frequency, a supporting member supporting said element to be vibrated, means for securing said supporting element to said vibratory element at the middle portion thereof, an armature carried by said support, electromagnetic means arranged in electromagnetic relation to said armature and operative to cause vibratory movement of said armature and vibrator element at said predetermined frequency, and supporting means for said electromagnetic means carried by said frame.

14. Electric vibrating mechanism as claimed in claim 13, wherein means are provided carried by said supporting means for effecting adjustment of said electromagnetic means relatively to said armature.

15. Electric vibrating mechanism comprising in combination, a frame structure, means to be vibrated, vibrating means mounted on said frame structure and arranged in itself to be capable of maintaining said means to be vibrated in vibratory movement at a predetermined frequency, electromagnetic means mounted on said frame structure and arranged in electromagnetic connection with said vibrating means and operative to maintain said means in vibration at said predetermined frequency, an overhead supporting structure, and means for suspending said frame structure from said supporting structure comprising a plurality of suspension means each having interposed in the length thereof a compressible cushioning spring.

16. Vibrating mechanism as claimed in claim 15, wherein each of said suspension means includes a casing, a compression spring within said casing and bearing against the lower end thereof, a rod element bearing at its upper end against the upper end of said spring, a hanger element connected with the lower end of said rod and with said frame structure, and a rod connected with the upper end of said casing and supported at its upper end from said supporting structure.

In testimony whereof I affix my signature.
JAMES A. FLINT.